March 18, 1930.  E. SCHMID  1,750,730
HEAT EXCHANGE DEVICE FOR FOOD LIQUIDS
Original Filed June 2, 1924  2 Sheets-Sheet 1
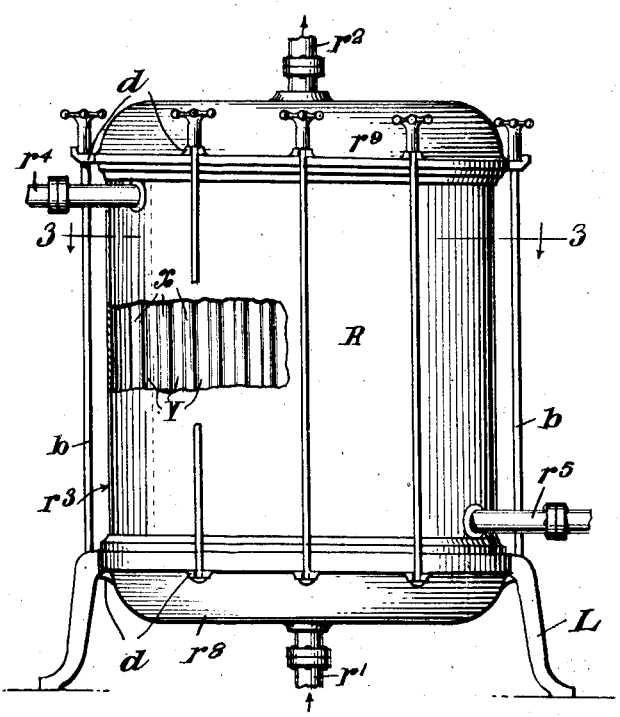
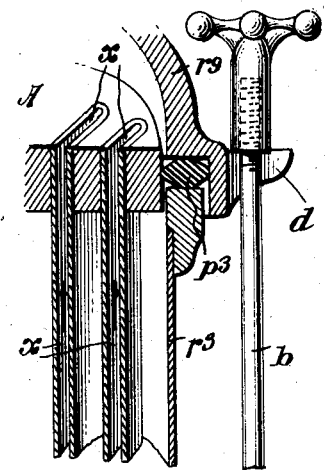
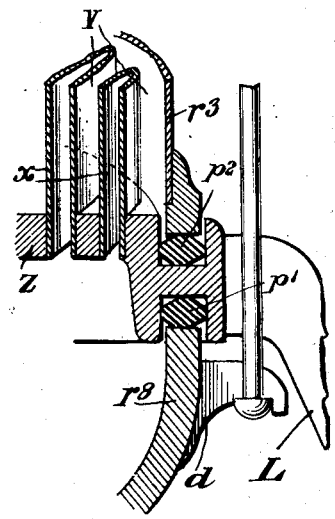
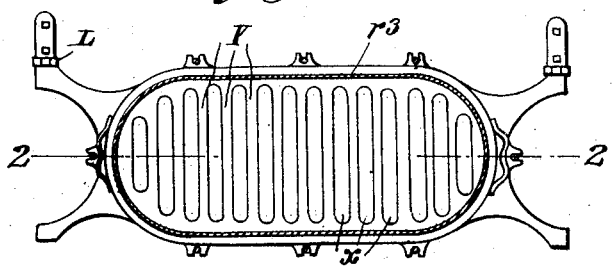
Inventor:
Emil Schmid March 18, 1930.  E. SCHMID  1,750,730
HEAT EXCHANGE DEVICE FOR FOOD LIQUIDS
Original Filed June 2, 1924  2 Sheets-Sheet 2
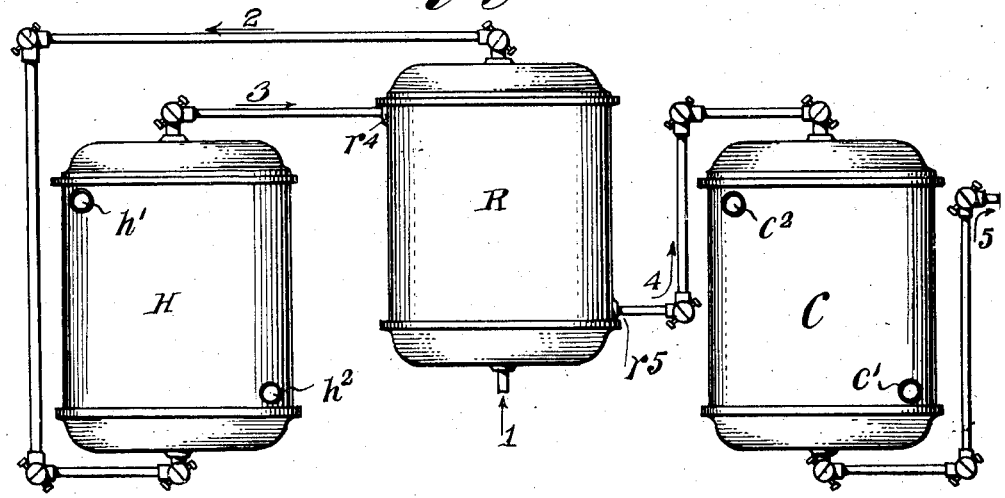
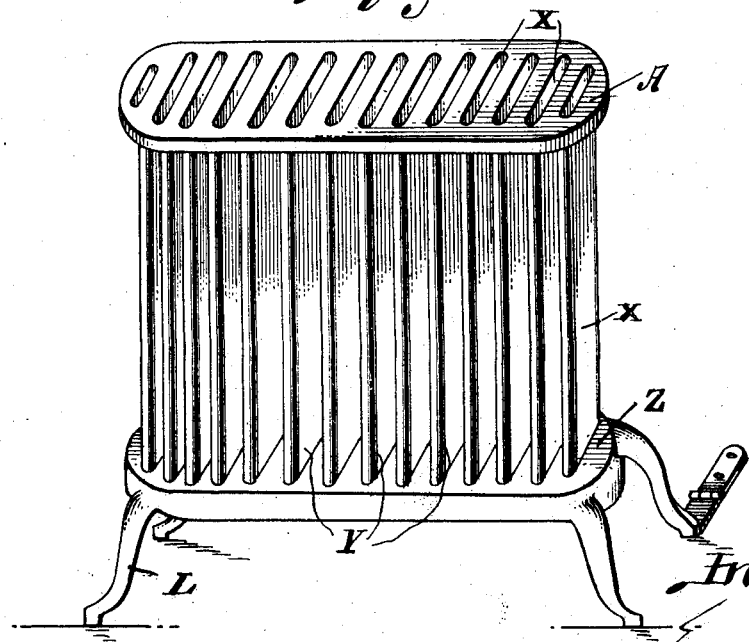

Patented Mar. 18, 1930

1,750,730

UNITED STATES PATENT OFFICE

EMIL SCHMID, OF WASHINGTON, DISTRICT OF COLUMBIA

HEAT-EXCHANGE DEVICE FOR FOOD LIQUIDS

Continuation of application Serial No. 717,390, filed June 2, 1924. This application filed February 1, 1926, Serial No. 85,371. Renewed August 12, 1929.

This is a continuation of my application, Serial Number 717,390, filed June 2nd, 1924, for apparatus for and process of electric regenerative liquid treatment.

One of the objects of my invention is to construct a machine which will pasteurize food liquids, especially milk, by the flash method, i. e. by quickly heating the milk to a temperature of 158° F. and then cooling it immediately to 48° F. or lower.

The correctness of this method has often been demonstrated by laboratory tests, and recent investigations carried out with the greatest accuracy and thoroughness have established the fact that heating milk to 149° F. and holding it at this temperature for five minutes, or momentary heating to 158° F. kills all pathogenic bacteria with certainty The equipment used heretofore to carry out this process commercially would not insure uniform heat penetration of every particle of the milk at all times, causing unsatisfactory results, and for this reason the holding process, whereby the temperature is raised to 145° F. and held at that point for 30 min. has been substituted.

The object of my invention is to construct an apparatus which will insure uniform heat penetration of every particle of the milk at all times, thus making the flash method commercially possible.

On way of doing this is by using electricity as heat conveying medium, as disclosed in my application, Serial Number 717,390, filed June 2nd, 1924.

Another way as disclosed hereinafter consists of dividing the milk into a number of thin streams and passing same through water slightly above the desired temperature, which results in quick and uniform heat penetration, without a possibility of overheating.

Another object of my invention is to provide a heat exchange unit which may be easily and quickly disassembled, cleaned and reassembled.

Another object of my invention is to provide a liquid treating or pasteurizing apparatus which will occupy less space than other equipment of equal capacity.

Another object of my invention is to provide a pasteurizer which can be produced and installed at less cost than present equipment, and which will be more efficient and of lower operating cost than apparatus now in use.

Another object of my invention is to connect two or more heat exchange units of substantially the same construction in series so as to pre-heat, finally heat, pre-cool and finally cool a liquid without exposing same to contamination through the air at any stage of the process.

Another object of my invention is to bring every particle of the liquid in close proximity to the heat exchange surface without the use of paddles or stirrers as is necessary with apparatus now in use, and to keep the water at the proper temperature without the use of steam.

Further objects of my invention will appear from the drawings and description of the same.

In the annexed drawings which are illustrative of the preferred form of my invention:

Fig. 1 is an elevation of my heat exchange unit with a part broken away.

Fig. 2 is a fragmentary detail section somewhat in perspective on line 2—2 in Fig. 3 on a larger scale.

Fig. 3 is a cross section on line 3—3 in Fig. 1.

Fig. 4 is a perspective view of the heat exchange unit, with top and bottom closures and shell removed, and Fig. 5 shows three units on a smaller scale connected to carry out the process of pasteurization and cooling. In this connection, unit H acts as heater, unit R as regenerative pre-heater and pre-cooler, and unit C as final cooler. In view of the fact that these units are all constructed in substantially the same manner a description of one will suffice for the description of the others.

My unit consists of a slotted top plate A, a slotted bottom plate Z, and a series of flat tubes X, brazed into the corresponding slots in the top and bottom plates.

The bottom plate Z may be supported by legs L, two of which are hingedly connected to the floor in order that the unit may be tilted for more convenient assembling and cleaning. Trunnions or any other form of support may be used in place of legs if desired. The shell $r^3$ fits removably around the center structure form of plates A, Z, and tubes X, and rests on packing $p^2$ in the grooved rim of bottom plates Z, as shown in Fig. 2. The top closure $r^9$ and bottom closure $r^8$ are clamped to the plates A and Z respectively and shell $r^3$ with bolts $b$ which fit into ears $d$ on the closures $r^9$ and $r^8$ as shown in Fig. 2, the packings $p^1$, $p^2$ and $p^3$ being provided to form leakproof joints.

It will readily be seen that if a cold liquid enters at $r^1$, passes upward through the tubes X and outlet $r^2$, while a hot liquid enters shell $r^3$ at $r^4$, passes downward through the spaces Y between tubes X and outlet $r^5$, the cold liquid in its upward path will rapidly be heated by the surrounding hot liquid, while the latter will be cooled at the same ratio as it passes downward, without the liquids coming in contact with each other.

The purpose of making shell $r^3$ removable is to permit cleaning of tubes X on the outside, also the inner surfaces of plates A and Z. This is necessary when the unit is used as a regenerator, having milk in both passages in that case. When used as heating or cooling unit only, cleaning on inside of shell $r^3$ might not be necessary and in that case shell $r^3$ may be permanently attached to plates A and Z.

The tubes X are made flat to insure quick heat penetration and provide the largest possible amount of heat exchange surface within the unit. They are arranged in single series because if two or more rows were used as in the ordinary tubular boiler it would be impossible to properly clean the inner surfaces between the tubes, which would render the apparatus unfit for the purpose intended for sanitary reasons.

In the operation of my improved pasteurizer as shown in Fig. 5 the raw milk is pumped to the regenerative unit R and enters the same at the point indicated by arrow 1, then passes upward through the tubes X, moves as indicated by arrow 2, enters the final heating unit H at the bottom inlet, passes upward through tubes X, moves as shown by arrow 3, enters the regenerative unit R at $r^4$, descends through the spaces Y, leaves at $r^5$, follows arrow 4, enters the final cooling unit C at the top, descends through the tubes X, leaves the unit through bottom outlet and moves as shown by the arrow 5 to the bottling machine.

Hot water at a temperature slightly above the desired pasteurizing temperature enters into the heater H at $h^1$, descends through spaces Y and leaves at $h^2$. Thermometers may be installed at the inlet and outlet to observe the temperature of the water.

I use preferably an oil or gas burning boiler for heating the water, placing the fuel control valve near the unit H, which enables me to control the heat conveniently and accurately. The water should be moved by means of a pump at a sufficient speed to pass the water from outlet $h^2$ at a temperature slightly below the desired pasteurizing temperature. It will readily be seen that the temperature of the milk on its path through tubes X in unit H is raised rapidly and uniformly to the desired pasteurizing temperature, without any possibility of being overheated or underheated.

Cold brine circulates through spaces Y in cooler C, entering at $C^1$ and leaving at $C^2$, in order that the milk may be finally cooled.

Should it be desired to hold the milk at the pasteurizing temperature for a definite period of time as required by health ordinances of certain communities a holding vat of any approved type may be inserted in the pipe line leading from heater H to regenerative unit R.

While I have shown and described a preferred form of my invention it is understood that I reserve the right to make such changes as come within the scope of appended claims.

What I claim as my invention is:

1. A heat exchange device consisting of a section having two separate end plates, openings in the end plates, flat tubes extending between corresponding openings in the end plates, the transverse dimension of each tube extending substantially the full width of the plate, an easily removable shell which may be placed around said section, removable closures for the ends of the section and means for holding the section, shell and closures in co-operative relationship to each other.

2. A heat exchange device having a section consisting of a number of tubes the ends of which fit into corresponding openings in two end plates and attached permanently thereto, a support for the section, a removable shell for the section, removable end closures for the section, means for holding the section, shell and end closures in co-operative relationship, all being so arranged that the shell and end closures may be removed from the section while the section remains seated on its support.

3. A heat exchange device having a section consisting of a number of tubes fitted into corresponding openings in two end plates and attached permanently thereto, supporting legs for the section, a removable shell for the section, removable end closures for the section, means for holding the section, shell and end closures in co-operative relationship, all being so arranged that the shell and end closures may be removed from the section without removing the section from the supporting legs.

4. A pasteurizing apparatus comprising a tube section and cover means therefor, said tube section comprising two end plates with perforations, said perforations united at the edges by a plurality of substantially axially parallel flat tubes each having two narrow side portions, both narrow side portions of each of said tubes joining said end plates substantially at the peripheries of said end plates, the space between said tubes being unobstructed, said cover means comprising a rigid endless band fitting snugly around but removable over one of said end plates, said band being adapted to extend substantially from one to the other of said end plates, means for providing readily releasable tight connections between said end plates, endless band and end covers, and inlets and outlets in said endless band and end covers.

5. An apparatus as defined in claim 4 in which the tube section is provided with supports independent of said cover means.

6. A heat exchange apparatus comprising a tube section and end cover means therefor, said section comprising two end plates with perforations, said perforations united at the edges by a plurality of substantially axially parallel flat tubes each having two narrow side portions, both narrow side portions of each of said tubes joining said plates substantially at the peripheries of said end plates, a rigid endless band secured to said end plates and extending from one to the other of said end plates, means for providing readily releasable tight connections between said tube section and cover means and inlets and outlets in said endless band and said covers.

7. A section for a heat exchange device consisting of two separate end plates having openings therein and flat tubes extending between corresponding openings in each plate, the narrow wall section of each tube being in proximity to the edges of the plate, a removable shell which may be placed around said section, removable closures for the ends of the section, means for holding the section, shell and closures in cooperative relationship to each other.

In testimony whereof I affix my signature.

EMIL SCHMID.